(12) United States Patent
Shaburova

(10) Patent No.: US 11,514,947 B1
(45) Date of Patent: *Nov. 29, 2022

(54) METHOD FOR REAL-TIME VIDEO PROCESSING INVOLVING CHANGING FEATURES OF AN OBJECT IN THE VIDEO

(71) Applicant: Snap Inc., Santa Monica, CA (US)

(72) Inventor: Elena Shaburova, Castro Valley, CA (US)

(73) Assignee: Snap Inc., Santa Monica, CA (US)

( * ) Notice: Subject to any disclaimer, the term of this patent is extended or adjusted under 35 U.S.C. 154(b) by 29 days.

This patent is subject to a terminal disclaimer.

(21) Appl. No.: 16/732,858

(22) Filed: Jan. 2, 2020

Related U.S. Application Data

(63) Continuation of application No. 15/921,282, filed on Mar. 14, 2018, now Pat. No. 10,566,026, which is a
(Continued)

(51) Int. Cl.
*G06K 9/20* (2006.01)
*G06K 9/36* (2006.01)
(Continued)

(52) U.S. Cl.
CPC ............ *G11B 27/031* (2013.01); *G06F 3/011* (2013.01); *G06N 20/00* (2019.01); *G06T 5/005* (2013.01);
(Continued)

(58) Field of Classification Search
None
See application file for complete search history.

(56) References Cited

U.S. PATENT DOCUMENTS

| | | |
|---|---|---|
| 4,888,713 A | 12/1989 | Falk |
| 5,227,863 A | 7/1993 | Bilbrey et al. |

(Continued)

FOREIGN PATENT DOCUMENTS

| | | |
|---|---|---|
| CA | 2887596 A1 | 7/2015 |
| CN | 1411277 A | 4/2003 |

(Continued)

OTHER PUBLICATIONS

Tchoulack et al., "A video stream processor for real-time detection and correction of specular reflections in endoscopic images." In 2008 Joint 6th International IEEE Northeast Workshop on Circuits and Systems and TAISA Conference, pp. 49-52. IEEE, 2008. (Year: 2008).*

(Continued)

*Primary Examiner* — Feng Niu
(74) *Attorney, Agent, or Firm* — Schwegman Lundberg & Woessner, P.A.

(57) ABSTRACT

A method for real-time video processing for changing features of an object in a video, the method comprises: providing an object in the video, the object being at least partially and at least occasionally presented in frames of the video; detecting the object in the video; generating a list of at least one element of the object, the list being based on the object's features to be changed according to a request for modification; detecting the at least one element of the object in the video;
tracking the at least one element of the object in the video; and transforming the frames of the video such that the at least one element of the object is modified according to the request for modification.

20 Claims, 6 Drawing Sheets

Related U.S. Application Data continuation of application No. 14/314,324, filed on Jun. 25, 2014, now Pat. No. 9,928,874.

(60) Provisional application No. 61/936,016, filed on Feb. 5, 2014.

(51) Int. Cl.

| | | |
|---|---|---|
| *G11B 27/031* | (2006.01) | |
| *G06T 13/40* | (2011.01) | |
| *G06T 19/20* | (2011.01) | |
| *G06T 17/20* | (2006.01) | |
| *G06T 7/246* | (2017.01) | |
| *G06T 11/00* | (2006.01) | |
| *G06F 3/01* | (2006.01) | |
| *G06N 20/00* | (2019.01) | |
| *H04N 5/262* | (2006.01) | |
| *G06T 5/00* | (2006.01) | |
| *G06T 7/33* | (2017.01) | |
| *G06T 11/60* | (2006.01) | |
| *H04N 9/79* | (2006.01) | |
| *G06T 7/90* | (2017.01) | |
| *G06V 10/40* | (2022.01) | |
| *G06V 10/42* | (2022.01) | |
| *G06V 10/56* | (2022.01) | |
| *G06V 10/60* | (2022.01) | |
| *G06V 20/40* | (2022.01) | |
| *G06V 40/20* | (2022.01) | |
| *G06V 40/16* | (2022.01) | |
| *G06V 10/46* | (2022.01) | |

(52) U.S. Cl.
CPC .............. *G06T 7/246* (2017.01); *G06T 7/251* (2017.01); *G06T 7/33* (2017.01); *G06T 7/90* (2017.01); *G06T 11/001* (2013.01); *G06T 11/60* (2013.01); *G06T 13/40* (2013.01); *G06T 17/20* (2013.01); *G06T 19/20* (2013.01); *G06V 10/40* (2022.01); *G06V 10/42* (2022.01); *G06V 10/56* (2022.01); *G06V 10/60* (2022.01); *G06V 20/40* (2022.01); *G06V 20/46* (2022.01); *G06V 40/167* (2022.01); *G06V 40/168* (2022.01); *G06V 40/171* (2022.01); *G06V 40/174* (2022.01); *G06V 40/20* (2022.01); *H04N 5/262* (2013.01); *H04N 9/79* (2013.01); *G06T 2207/10016* (2013.01); *G06T 2207/10021* (2013.01); *G06T 2207/10024* (2013.01); *G06T 2207/20036* (2013.01); *G06T 2207/30201* (2013.01); *G06V 10/467* (2022.01)

(56) References Cited

U.S. PATENT DOCUMENTS

| | | | |
|---|---|---|---|
| 5,359,706 A | | 10/1994 | Sterling |
| 5,479,603 A | | 12/1995 | Stone et al. |
| 5,715,382 A | | 2/1998 | Herregods et al. |
| 5,990,973 A | | 11/1999 | Sakamoto |
| 6,016,150 A | | 1/2000 | Lengyel et al. |
| 6,038,295 A | | 3/2000 | Mattes |
| 6,252,576 B1 | | 6/2001 | Nottingham |
| 6,278,491 B1 | | 8/2001 | Wang et al. |
| H2003 H | | 11/2001 | Minner |
| 6,492,986 B1 * | | 12/2002 | Metaxas ............... G06V 40/20 345/474 |
| 6,621,939 B1 | | 9/2003 | Negishi et al. |
| 6,664,956 B1 | | 12/2003 | Erdem |
| 6,768,486 B1 | | 7/2004 | Szabo et al. |
| 6,771,303 B2 | | 8/2004 | Zhang et al. |
| 6,806,898 B1 | | 10/2004 | Toyama et al. |
| 6,807,290 B2 | | 10/2004 | Liu et al. |
| 6,829,391 B2 | | 12/2004 | Comaniciu et al. |
| 6,891,549 B2 | | 5/2005 | Gold |
| 6,897,977 B1 | | 5/2005 | Bright |
| 6,980,909 B2 | | 12/2005 | Root et al. |
| 7,034,820 B2 | | 4/2006 | Urisaka et al. |
| 7,035,456 B2 | | 4/2006 | Lestideau |
| 7,039,222 B2 | | 5/2006 | Simon et al. |
| 7,050,078 B2 | | 5/2006 | Dempski |
| 7,119,817 B1 | | 10/2006 | Kawakami |
| 7,167,519 B2 | | 1/2007 | Comaniciu et al. |
| 7,173,651 B1 | | 2/2007 | Knowles |
| 7,212,656 B2 | | 5/2007 | Liu et al. |
| 7,227,567 B1 | | 6/2007 | Beck et al. |
| 7,239,312 B2 | | 7/2007 | Urisaka et al. |
| 7,411,493 B2 | | 8/2008 | Smith |
| 7,415,140 B2 | | 8/2008 | Nagahashi et al. |
| 7,535,890 B2 | | 5/2009 | Rojas |
| 7,538,764 B2 | | 5/2009 | Salomie |
| 7,564,476 B1 | | 7/2009 | Coughlan et al. |
| 7,612,794 B2 | | 11/2009 | He et al. |
| 7,671,318 B1 | | 3/2010 | Tener et al. |
| 7,697,787 B2 | | 4/2010 | Illsley |
| 7,710,608 B2 | | 5/2010 | Takahashi |
| 7,720,283 B2 | | 5/2010 | Sun et al. |
| 7,782,506 B2 | | 8/2010 | Suzuki et al. |
| 7,812,993 B2 | | 10/2010 | Bright |
| 7,830,384 B1 | | 11/2010 | Edwards et al. |
| 7,945,653 B2 | | 5/2011 | Zuckerberg et al. |
| 7,971,156 B2 | | 6/2011 | Albertson et al. |
| 7,996,793 B2 | | 8/2011 | Latta et al. |
| 8,026,931 B2 * | | 9/2011 | Sun ................ G06T 11/00 345/632 |
| 8,086,060 B1 | | 12/2011 | Gilra et al. |
| 8,090,160 B2 | | 1/2012 | Kakadiaris et al. |
| 8,131,597 B2 | | 3/2012 | Hudetz |
| 8,199,747 B2 | | 6/2012 | Rojas et al. |
| 8,230,355 B1 | | 7/2012 | Bauermeister et al. |
| 8,233,789 B2 | | 7/2012 | Brunner |
| 8,253,789 B2 | | 8/2012 | Aizaki et al. |
| 8,294,823 B2 | | 10/2012 | Ciudad et al. |
| 8,295,557 B2 | | 10/2012 | Wang et al. |
| 8,296,456 B2 | | 10/2012 | Klappert |
| 8,314,842 B2 | | 11/2012 | Kudo |
| 8,332,475 B2 | | 12/2012 | Rosen et al. |
| 8,335,399 B2 | | 12/2012 | Gyotoku |
| 8,385,684 B2 | | 2/2013 | Sandrew et al. |
| 8,421,873 B2 | | 4/2013 | Majewicz et al. |
| 8,462,198 B2 | | 6/2013 | Lin et al. |
| 8,487,938 B2 | | 7/2013 | Latta et al. |
| 8,520,093 B2 | | 8/2013 | Nanu et al. |
| 8,638,993 B2 | | 1/2014 | Lee et al. |
| 8,675,972 B2 | | 3/2014 | Lefevre et al. |
| 8,687,039 B2 | | 4/2014 | Degrazia et al. |
| 8,692,830 B2 | | 4/2014 | Nelson et al. |
| 8,717,465 B2 | | 5/2014 | Ning |
| 8,718,333 B2 | | 5/2014 | Wolf et al. |
| 8,724,622 B2 | | 5/2014 | Rojas |
| 8,743,210 B2 | | 6/2014 | Lin |
| 8,761,497 B2 | | 6/2014 | Berkovich et al. |
| 8,766,983 B2 | | 7/2014 | Marks et al. |
| 8,810,696 B2 | | 8/2014 | Ning |
| 8,823,769 B2 | | 9/2014 | Sekine |
| 8,824,782 B2 | | 9/2014 | Ichihashi et al. |
| 8,856,691 B2 | | 10/2014 | Geisner et al. |
| 8,874,677 B2 | | 10/2014 | Rosen et al. |
| 8,897,596 B1 | | 11/2014 | Passmore et al. |
| 8,909,679 B2 | | 12/2014 | Root et al. |
| 8,929,614 B2 | | 1/2015 | Oicherman et al. |
| 8,934,665 B2 | | 1/2015 | Kim et al. |
| 8,958,613 B2 | | 2/2015 | Kondo et al. |
| 8,976,862 B2 | | 3/2015 | Kim et al. |
| 8,988,490 B2 | | 3/2015 | Fujii |
| 8,995,433 B2 | | 3/2015 | Rojas |
| 9,032,314 B2 | | 5/2015 | Mital et al. |
| 9,040,574 B2 | | 5/2015 | Wang et al. |
| 9,055,416 B2 | | 6/2015 | Rosen et al. |
| 9,100,806 B2 | | 8/2015 | Rosen et al. |
| 9,100,807 B2 | | 8/2015 | Rosen et al. |

(56) References Cited

U.S. PATENT DOCUMENTS

| | | |
|---|---|---|
| 9,191,776 B2 | 11/2015 | Root et al. |
| 9,204,252 B2 | 12/2015 | Root |
| 9,225,897 B1 | 12/2015 | Sehn et al. |
| 9,230,160 B1 | 1/2016 | Kanter |
| 9,232,189 B2 | 1/2016 | Shaburov et al. |
| 9,276,886 B1 | 3/2016 | Samaranayake |
| 9,311,534 B2 | 4/2016 | Liang |
| 9,364,147 B2 | 6/2016 | Wakizaka et al. |
| 9,396,525 B2 | 7/2016 | Shaburova et al. |
| 9,412,007 B2 | 8/2016 | Nanu et al. |
| 9,443,227 B2 | 9/2016 | Evans et al. |
| 9,489,661 B2 | 11/2016 | Evans et al. |
| 9,491,134 B2 | 11/2016 | Rosen et al. |
| 9,565,362 B2 | 2/2017 | Kudo |
| 9,705,831 B2 | 7/2017 | Spiegel |
| 9,742,713 B2 | 8/2017 | Spiegel et al. |
| 9,848,293 B2 | 12/2017 | Murray et al. |
| 9,928,874 B2 | 3/2018 | Shaburova |
| 10,102,423 B2 | 10/2018 | Shaburov et al. |
| 10,116,901 B2 | 10/2018 | Shaburov et al. |
| 10,255,948 B2 | 4/2019 | Shaburova et al. |
| 10,271,010 B2 | 4/2019 | Gottlieb |
| 10,283,162 B2 | 5/2019 | Shaburova et al. |
| 10,284,508 B1 | 5/2019 | Allen et al. |
| 10,438,631 B2 | 10/2019 | Shaburova et al. |
| 10,439,972 B1 | 10/2019 | Spiegel et al. |
| 10,509,466 B1 | 12/2019 | Miller et al. |
| 10,514,876 B2 | 12/2019 | Sehn |
| 10,566,026 B1 | 2/2020 | Shaburova |
| 10,586,570 B2 | 3/2020 | Shaburova et al. |
| 10,614,855 B2 | 4/2020 | Huang |
| 10,748,347 B1 | 8/2020 | Li et al. |
| 10,950,271 B1 | 3/2021 | Shaburova et al. |
| 10,958,608 B1 | 3/2021 | Allen et al. |
| 10,962,809 B1 | 3/2021 | Castañeda |
| 10,991,395 B1 | 4/2021 | Shaburova et al. |
| 10,996,846 B2 | 5/2021 | Robertson et al. |
| 10,997,787 B2 | 5/2021 | Ge et al. |
| 11,012,390 B1 | 5/2021 | Al Majid et al. |
| 11,030,454 B1 | 6/2021 | Xiong et al. |
| 11,036,368 B1 | 6/2021 | Al Majid et al. |
| 11,062,498 B1 | 7/2021 | Voss et al. |
| 11,087,728 B1 | 8/2021 | Canberk et al. |
| 11,092,998 B1 | 8/2021 | Castañeda et al. |
| 11,106,342 B1 | 8/2021 | Al Majid et al. |
| 11,126,206 B2 | 9/2021 | Meisenholder et al. |
| 11,143,867 B2 | 10/2021 | Rodriguez, II |
| 11,169,600 B1 | 11/2021 | Canberk et al. |
| 11,227,626 B1 | 1/2022 | Krishnan Gorumkonda et al. |
| 11,290,682 B1 | 3/2022 | Shaburov et al. |
| 2001/0004417 A1 | 6/2001 | Narutoshi et al. |
| 2002/0006431 A1 | 1/2002 | Tramontana |
| 2002/0012454 A1 | 1/2002 | Liu et al. |
| 2002/0064314 A1 | 5/2002 | Comaniciu et al. |
| 2002/0163516 A1 | 11/2002 | Hubbell |
| 2003/0107568 A1 | 6/2003 | Urisaka et al. |
| 2003/0132946 A1 | 7/2003 | Gold |
| 2003/0228135 A1 | 12/2003 | Illsley |
| 2004/0037475 A1 | 2/2004 | Avinash et al. |
| 2004/0076337 A1 | 4/2004 | Nishida |
| 2004/0119662 A1 | 6/2004 | Dempski |
| 2004/0130631 A1 | 7/2004 | Suh |
| 2004/0233223 A1 | 11/2004 | Schkolne et al. |
| 2005/0046905 A1 | 3/2005 | Aizaki et al. |
| 2005/0073585 A1 | 4/2005 | Ettinger et al. |
| 2005/0117798 A1 | 6/2005 | Patton et al. |
| 2005/0128211 A1 | 6/2005 | Berger et al. |
| 2005/0131744 A1 | 6/2005 | Brown et al. |
| 2005/0180612 A1 | 8/2005 | Nagahashi et al. |
| 2005/0190980 A1 | 9/2005 | Bright |
| 2005/0202440 A1 | 9/2005 | Fletterick et al. |
| 2005/0220346 A1 | 10/2005 | Akahori |
| 2005/0238217 A1 | 10/2005 | Enomoto et al. |
| 2006/0098248 A1 | 5/2006 | Suzuki et al. |
| 2006/0110004 A1 | 5/2006 | Wu et al. |
| 2006/0170937 A1 | 8/2006 | Takahashi |
| 2006/0227997 A1 | 10/2006 | Au et al. |
| 2006/0242183 A1 | 10/2006 | Niyogi et al. |
| 2006/0269128 A1 | 11/2006 | Vladislav |
| 2006/0290695 A1 | 12/2006 | Salomie |
| 2007/0013709 A1 | 1/2007 | Charles et al. |
| 2007/0087352 A9 | 4/2007 | Fletterick et al. |
| 2007/0140556 A1 | 6/2007 | Willamowski et al. |
| 2007/0159551 A1 | 7/2007 | Kotani |
| 2007/0216675 A1* | 9/2007 | Sun .................. G06T 11/00 345/419 |
| 2007/0223830 A1 | 9/2007 | Ono |
| 2007/0258656 A1 | 11/2007 | Aarabi et al. |
| 2007/0268312 A1 | 11/2007 | Marks et al. |
| 2008/0063285 A1 | 3/2008 | Porikli et al. |
| 2008/0077953 A1 | 3/2008 | Fernandez et al. |
| 2008/0184153 A1 | 7/2008 | Matsumura et al. |
| 2008/0187175 A1 | 8/2008 | Kim et al. |
| 2008/0204992 A1 | 8/2008 | Swenson et al. |
| 2008/0212894 A1 | 9/2008 | Demirli et al. |
| 2009/0012788 A1 | 1/2009 | Gilbert |
| 2009/0027732 A1 | 1/2009 | Imai |
| 2009/0158170 A1 | 6/2009 | Narayanan et al. |
| 2009/0290791 A1 | 11/2009 | Holub et al. |
| 2009/0309878 A1 | 12/2009 | Otani et al. |
| 2009/0310828 A1 | 12/2009 | Kakadiaris et al. |
| 2010/0074475 A1 | 3/2010 | Chouno |
| 2010/0177981 A1 | 7/2010 | Wang et al. |
| 2010/0185963 A1 | 7/2010 | Slik et al. |
| 2010/0188497 A1 | 7/2010 | Aizaki et al. |
| 2010/0202697 A1 | 8/2010 | Matsuzaka et al. |
| 2010/0203968 A1 | 8/2010 | Gill et al. |
| 2010/0231590 A1 | 9/2010 | Erceis et al. |
| 2010/0316281 A1 | 12/2010 | Lefevre |
| 2011/0018875 A1 | 1/2011 | Arahari et al. |
| 2011/0038536 A1 | 2/2011 | Gong |
| 2011/0182357 A1 | 7/2011 | Kim et al. |
| 2011/0202598 A1 | 8/2011 | Evans et al. |
| 2011/0261050 A1 | 10/2011 | Smolic et al. |
| 2011/0273620 A1 | 11/2011 | Berkovich et al. |
| 2011/0299776 A1 | 12/2011 | Lee et al. |
| 2011/0301934 A1 | 12/2011 | Tardif |
| 2012/0050323 A1 | 3/2012 | Baron, Jr. et al. |
| 2012/0106806 A1 | 5/2012 | Foita et al. |
| 2012/0136668 A1 | 5/2012 | Kuroda |
| 2012/0144325 A1 | 6/2012 | Mital et al. |
| 2012/0167146 A1 | 6/2012 | Incorvia |
| 2012/0209924 A1 | 8/2012 | Evans et al. |
| 2012/0288187 A1 | 11/2012 | Ichihashi et al. |
| 2012/0306853 A1 | 12/2012 | Wright et al. |
| 2012/0327172 A1 | 12/2012 | El-Saban et al. |
| 2013/0004096 A1 | 1/2013 | Goh et al. |
| 2013/0114867 A1 | 5/2013 | Kondo et al. |
| 2013/0155169 A1 | 6/2013 | Hoover et al. |
| 2013/0190577 A1 | 7/2013 | Brunner et al. |
| 2013/0201105 A1 | 8/2013 | Ptucha et al. |
| 2013/0201187 A1 | 8/2013 | Tong et al. |
| 2013/0201328 A1 | 8/2013 | Chung |
| 2013/0208129 A1 | 8/2013 | Stenman |
| 2013/0216094 A1 | 8/2013 | Delean |
| 2013/0229409 A1 | 9/2013 | Song et al. |
| 2013/0235086 A1 | 9/2013 | Otake |
| 2013/0278600 A1 | 10/2013 | Christensen |
| 2013/0287291 A1 | 10/2013 | Cho |
| 2013/0342629 A1 | 12/2013 | North et al. |
| 2014/0043329 A1 | 2/2014 | Wang et al. |
| 2014/0171036 A1 | 6/2014 | Simmons |
| 2014/0179347 A1 | 6/2014 | Murray et al. |
| 2014/0198177 A1* | 7/2014 | Castellani .............. G06T 11/00 348/43 |
| 2014/0228668 A1 | 8/2014 | Wakizaka et al. |
| 2015/0055829 A1 | 2/2015 | Liang |
| 2015/0097834 A1 | 4/2015 | Ma et al. |
| 2015/0116350 A1 | 4/2015 | Lin et al. |
| 2015/0116448 A1 | 4/2015 | Gottlieb |
| 2015/0120293 A1 | 4/2015 | Wohlert et al. |
| 2015/0131924 A1 | 5/2015 | He et al. |
| 2015/0145992 A1 | 5/2015 | Traff |
| 2015/0163416 A1 | 6/2015 | Nevatie |

(56) References Cited

U.S. PATENT DOCUMENTS

| | | |
|---|---|---|
| 2015/0195491 A1 | 7/2015 | Shaburov et al. |
| 2015/0213604 A1 | 7/2015 | Li et al. |
| 2015/0220252 A1 | 8/2015 | Mital et al. |
| 2015/0221069 A1 | 8/2015 | Shaburova et al. |
| 2015/0221118 A1 | 8/2015 | Shaburova |
| 2015/0221136 A1 | 8/2015 | Shaburova et al. |
| 2015/0221338 A1 | 8/2015 | Shaburova et al. |
| 2015/0222821 A1 | 8/2015 | Shaburova |
| 2015/0370320 A1 | 12/2015 | Connor |
| 2016/0012627 A1 | 1/2016 | Kishikawa et al. |
| 2016/0253550 A1 | 9/2016 | Zhang et al. |
| 2016/0322079 A1 | 11/2016 | Shaburova et al. |
| 2017/0019633 A1 | 1/2017 | Shaburov et al. |
| 2017/0098122 A1* | 4/2017 | el Kaliouby ............ G16H 50/70 |
| 2017/0123487 A1 | 5/2017 | Hazra et al. |
| 2017/0277684 A1 | 9/2017 | Dharmarajan |
| 2017/0277685 A1 | 9/2017 | Takumi |
| 2017/0351910 A1 | 12/2017 | Elwazer et al. |
| 2018/0158370 A1 | 6/2018 | Pryor |
| 2018/0036481 A1 | 12/2018 | Parshionikar |
| 2020/0160886 A1 | 5/2020 | Shaburova |
| 2021/0011612 A1 | 1/2021 | Dancie et al. |
| 2021/0074016 A1 | 3/2021 | Li et al. |
| 2021/0166732 A1 | 6/2021 | Shaburova et al. |
| 2021/0174034 A1 | 6/2021 | Retek et al. |
| 2021/0241529 A1 | 8/2021 | Cowburn et al. |
| 2021/0303075 A1 | 9/2021 | Cowburn et al. |
| 2021/0303077 A1 | 9/2021 | Anvaripour et al. |
| 2021/0303140 A1 | 9/2021 | Mourkogiannis |
| 2021/0382564 A1 | 12/2021 | Blachly et al. |
| 2021/0397000 A1 | 12/2021 | Rodriguez, II |

FOREIGN PATENT DOCUMENTS

| | | |
|---|---|---|
| CN | 1811793 A | 8/2006 |
| CN | 101167087 A | 4/2008 |
| CN | 101499128 A | 8/2009 |
| CN | 101753851 A | 6/2010 |
| CN | 102665062 A | 9/2012 |
| CN | 103620646 A | 3/2014 |
| CN | 103650002 A | 3/2014 |
| CN | 103999096 A | 8/2014 |
| CN | 104378553 A | 2/2015 |
| CN | 103049761 B | 8/2016 |
| CN | 107637072 A | 1/2018 |
| EP | 3707693 A1 | 9/2020 |
| KR | 20040058671 A | 7/2004 |
| KR | 100853122 B1 | 8/2008 |
| KR | 20080096252 A | 10/2008 |
| KR | 102031135 B1 | 10/2019 |
| KR | 102173786 B1 | 10/2020 |
| KR | 102346691 B1 | 1/2022 |
| KR | 102417043 B1 | 7/2022 |
| WO | WO-2016149576 A1 | 9/2016 |
| WO | WO-2016168591 A1 | 10/2016 |
| WO | WO-2019094618 A1 | 5/2019 |

OTHER PUBLICATIONS

Neoh et al., "Adaptive edge detection for real-time video processing using FPGAs." Global Signal Processing 7, No. 3 (2004): 2-3. (Year: 2004).*

Salmi et al., "Hierarchical grid transformation for image warping in the analysis of two-dimensional electrophoresis gels." Proteomics 2, No. 11 (2002): 1504-1515. (Year: 2002).*

Kaufmann et al., "Finite element image warping." In Computer Graphics Forum, vol. 32, No. 2pt1, pp. 31-39. Oxford, UK: Blackwell Publishing Ltd, 2013. (Year: 2013).*

Forlenza et al., "Real time corner detection for miniaturized electro-optical sensors onboard small unmanned aerial systems." Sensors 12, No. 1 (2012): 863-877. (Year: 2012).*

Phadke et al., "Illumination invariant Mean-shift tracking," 2013 IEEE Workshop on Applications of Computer Vision (WACV), 2013, pp. 407-412, doi: 10.1109/WACV.2013.6475047. (Year: 2013).*

Baldwin et al., "Resolution-appropriate shape representation." In Sixth International Conference on Computer Vision (IEEE Cat. No. 98CH36271), pp. 460-465. IEEE, 1998. (Year: 1998).*

Wikipedia, "Facial Action Coding System", published on Jan. 23, 2014 (Year: 2014).*

Lefevre et al., "Structure and appearance features for robust 3d facial actions tracking." In 2009 IEEE International Conference on Multimedia and Expo, pp. 298-301. IEEE, 2009. (Year: 2009).*

Su, Zihua. "Statistical shape modelling: automatic shape model building." PhD diss., UCL (University College London), 2011. (Year: 2011).*

Chen et al., "Robust Facial Feature Tracking Under Various Illuminations," 2006 International Conference on Image Processing, 2006, pp. 2829-2832, doi: 10.1109/ICIP.2006.312997. (Year: 2006).*

"U.S. Appl. No. 14/114,124, Response filed Oct. 5, 2016 to Final Office Action dated May 5, 2016", 14 pgs.

"U.S. Appl. No. 14/314,312, Advisory Action dated May 10, 2019", 3 pgs.

"U.S. Appl. No. 14/314,312, Final Office Action dated Mar. 22, 2019", 28 pgs.

"U.S. Appl. No. 14/314,312, Final Office Action dated Apr. 12, 2017", 34 pgs.

"U.S. Appl. No. 14/314,312, Final Office Action dated May 5, 2016", 28 pgs.

"U.S. Appl. No. 14/314,312, Final Office Action dated May 10, 2018", 32 pgs.

"U.S. Appl. No. 14/314,312, Non Final Office Action dated Jul. 5, 2019", 25 pgs.

"U.S. Appl. No. 14/314,312, Non Final Office Action dated Aug. 30, 2017", 32 pgs.

"U.S. Appl. No. 14/314,312, Non Final Office Action dated Oct. 17, 2016", 33 pgs.

"U.S. Appl. No. 14/314,312, Non Final Office Action dated Nov. 5, 2015", 26 pgs.

"U.S. Appl. No. 14/314,312, Non Final Office Action dated Nov. 27, 2018", 29 pgs.

"U.S. Appl. No. 14/314,312, Response filed Mar. 17, 2017 to Non Final Office Action dated Oct. 17, 2016", 12 pgs.

"U.S. Appl. No. 14/314,312, Response filed Jan. 28, 2019 to Non Final Office Action dated Nov. 27, 2018", 10 pgs.

"U.S. Appl. No. 14/314,312, Response filed Feb. 28, 2018 to Non Final Office Action dated Aug. 30, 2017", 13 pgs.

"U.S. Appl. No. 14/314,312, Response filed Apr. 5, 2016 to Non Final Office Action dated Nov. 5, 2015", 13 pgs.

"U.S. Appl. No. 14/314,312, Response filed Aug. 14, 2017 to Final Office Action dated Apr. 12, 2017", 16 pgs.

"U.S. Appl. No. 14/314,312, Response filed Sep. 6, 2018 to Final Office Action dated May 10, 2018", 12 pgs.

"U.S. Appl. No. 14/314,312, Response filed Oct. 5, 2016 to Final Office Action dated May 5, 2016", 12 pgs.

"U.S. Appl. No. 14/314,312, Response filed May 3, 2019 to Final Office Action dated Mar. 22, 2019", 11 pgs.

"U.S. Appl. No. 14/314,324, Advisory Action dated Sep. 21, 2017", 4 pgs.

"U.S. Appl. No. 14/314,324, Final Office Action dated May 3, 2017", 33 pgs.

"U.S. Appl. No. 14/314,324, Final Office Action dated May 5, 2016", 24 pgs.

"U.S. Appl. No. 14/314,324, Non Final Office Action dated Oct. 14, 2016", 26 pgs.

"U.S. Appl. No. 14/314,324, Non Final Office Action dated Nov. 5, 2015", 23 pgs.

"U.S. Appl. No. 14/314,324, Notice of Allowance dated Nov. 8, 2017", 7 pgs.

"U.S. Appl. No. 14/314,324, Response filed Feb. 14, 2017 to Non Final Office Action dated Oct. 14, 2016", 19 pgs.

"U.S. Appl. No. 14/314,324, Response filed Apr. 5, 2016 to Non Final Office Action dated Nov. 5, 2015", 15 pgs.

"U.S. Appl. No. 14/314,324, Response filed Sep. 1, 2017 to Final Office Action dated May 3, 2017", 10 pgs.

(56) References Cited

OTHER PUBLICATIONS

"U.S. Appl. No. 14/314,324, Response Filed Oct. 5, 2016 to Final Office Action dated May 5, 2016", 14 pgs.
"U.S. Appl. No. 14/314,324, Response filed Nov. 3, 2017 to Advisory Action dated Sep. 21, 2017", 11 pgs.
"U.S. Appl. No. 14/314,334, Appeal Brief filed Apr. 15, 2019", 19 pgs.
"U.S. Appl. No. 14/314,334, Examiner Interview Summary dated Apr. 28, 2017", 3 pgs.
"U.S. Appl. No. 14/314,334, Examiner Interview Summary dated Nov. 26, 2018", 3 pgs.
"U.S. Appl. No. 14/314,334, Final Office Action dated Feb. 15, 2019", 40 pgs.
"U.S. Appl. No. 14/314,334, Final Office Action dated May 16, 2016", 43 pgs.
"U.S. Appl. No. 14/314,334, Final Office Action dated May 31, 2018", 38 pgs.
"U.S. Appl. No. 14/314,334, Final Office Action dated Jul. 12, 2017", 40 pgs.
"U.S. Appl. No. 14/314,334, Non Final Office Action dated Jan. 22, 2018", 35 pgs.
"U.S. Appl. No. 14/314,334, Non Final Office Action dated Oct. 26, 2018", 39 pgs.
"U.S. Appl. No. 14/314,334, Non Final Office Action dated Nov. 13, 2015", 39 pgs.
"U.S. Appl. No. 14/314,334, Non Final Office Action dated Dec. 1, 2016", 45 pgs.
"U.S. Appl. No. 14/314,334, Notice of Allowance dated Jul. 1, 2019", 9 pgs.
"U.S. Appl. No. 14/314,334, Notice of Allowance dated Sep. 19, 2017", 5 pgs.
"U.S. Appl. No. 14/314,334, Response filed Apr. 13, 2016 to Non Final Office Action dated Nov. 13, 2015", 20 pgs.
"U.S. Appl. No. 14/314,334, Response Filed Apr. 23, 2018 to Non Final Office Action dated Jan. 22, 2018", 14 pgs.
"U.S. Appl. No. 14/314,334, Response filed May 20, 2017 to Non Final Office Action dated Dec. 1, 2016", 16 pgs.
"U.S. Appl. No. 14/314,334, Response filed Aug. 30, 2018 to Final Office Action dated May 31, 2018", 13 pgs.
"U.S. Appl. No. 14/314,334, Response filed Sep. 1, 2017 to Final Office Action dated Jul. 12, 2017", 12 pgs.
"U.S. Appl. No. 14/314,334, Response filed Oct. 17, 2016 to Final Office Action dated May 16, 2016", 16 pgs.
"U.S. Appl. No. 14/314,343, Final Office Action dated May 6, 2016", 19 pgs.
"U.S. Appl. No. 14/314,343, Final Office Action dated Aug. 15, 2017", 38 pgs.
"U.S. Appl. No. 14/314,343, Final Office Action dated Sep. 6, 2018", 43 pgs.
"U.S. Appl. No. 14/314,343, Non Final Office Action dated Apr. 19, 2018", 40 pgs.
"U.S. Appl. No. 14/314,343, Non Final Office Action dated Nov. 4, 2015", 14 pgs.
"U.S. Appl. No. 14/314,343, Non Final Office Action dated Nov. 17, 2016", 31 pgs.
"U.S. Appl. No. 14/314,343, Notice of Allowance dated Dec. 17, 2018", 5 pgs.
"U.S. Appl. No. 14/314,343, Response filed Feb. 15, 2018 to Final Office Action dated Aug. 15, 2017", 11 pgs.
"U.S. Appl. No. 14/314,343, Response filed Apr. 4, 2016 to Non Final Office Action dated Nov. 4, 2015", 10 pgs.
"U.S. Appl. No. 14/314,343, Response filed May 11, 2017 to Non Final Office Action dated Nov. 17, 2016", 13 pgs.
"U.S. Appl. No. 14/314,343, Response filed Jul. 19, 2018 to Non Final Office Action dated Apr. 19, 2018", 15 pgs.
"U.S. Appl. No. 14/314,343, Response filed Oct. 6, 2016 to Final Office Action dated May 6, 2016", 13 pgs.
"U.S. Appl. No. 14/314,343, Response Filed Oct. 11, 2018 to Final Office Action dated Sep. 6, 2018", 11 pgs.
"U.S. Appl. No. 14/325,477, Non Final Office Action dated Oct. 9, 2015", 17 pgs.
"U.S. Appl. No. 14/325,477, Notice of Allowance dated Mar. 17, 2016", 5 pgs.
"U.S. Appl. No. 14/325,477, Response filed Feb. 9, 2016 to Non Final Office Action dated Oct. 9, 2015", 13 pgs.
"U.S. Appl. No. 15/208,973, Final Office Action dated May 10, 2018", 13 pgs.
"U.S. Appl. No. 15/208,973, Non Final Office Action dated Sep. 19, 2017", 17 pgs.
"U.S. Appl. No. 15/208,973, Notice of Allowability dated Feb. 21, 2019", 3 pgs.
"U.S. Appl. No. 15/208,973, Notice of Allowance dated Nov. 20, 2018", 14 pgs.
"U.S. Appl. No. 15/208,973, Preliminary Amendment, filed Jan. 17, 2017", 9 pgs.
"U.S. Appl. No. 15/208,973, Response filed Sep. 5, 2018 to Final Office Action dated May 10, 2018", 10 pgs.
"U.S. Appl. No. 15/921,282, Notice of Allowance dated Oct. 2, 2019", 9 pgs.
"Bilinear interpolation", Wikipedia, [Online] Retrieved from the Internet: <URL: https://web.archive.org/web/20110921104425/http://en.wikipedia.org/wiki/Bilinear_interpolation>, (Jan. 8, 2014), 3 pgs.
"Imatest", [Online] Retrieved from the Internet on Jul. 10, 2015: <URL: https://web.archive.org/web/20150710000557/http://www.imatest.com/>, 3 pgs.
"KR 10-0853122 B1 machine translation", IP.com, (2008), 29 pgs.
Ahlberg, Jorgen, "Candide-3: An Updated Parameterised Face", Image Coding Group, Dept. of Electrical Engineering, Linkoping University, SE, (Jan. 2001), 16 pgs.
Baxes, Gregory A., et al., "Digital Image Processing: Principles and Applications, Chapter 4", New York: Wiley, (1994), 88-91.
Chen, et al., "Manipulating, Deforming and Animating Sampled Object Representations", Computer Graphics Forum vol. 26, (2007), 824-852 pgs.
Dornaika, F, et al., "On Appearance Based Face and Facial Action Tracking", IEEE Trans. Circuits Syst. Video Technol. 16(9), (Sep. 2006), 1107-1124.
Leyden, John, "This SMS will self-destruct in 40 seconds", [Online] Retrieved from the Internet: <URL: http://www.theregister.co.uk/2005/12/12/stealthtext/>, (Dec. 12, 2005), 1 pg.
Milborrow, S, et al., "Locating facial features with an extended active shape model", European Conference on Computer Vision, Springer, Berlin, Heidelberg, [Online] Retrieved from the Internet: <URL: http://www.milbo.org/stasm-files/locating-facial-features-with-an-extended-asm.pdf>, (2008), 11 pgs.
Ohya, Jun, et al., "Virtual Metamorphosis", IEEE MultiMedia, 6(2), (1999), 29-39.
"U.S. Appl. No. 14/314,312, Appeal Brief filed Oct. 3, 2019", 14 pgs.
"U.S. Appl. No. 14/314,312, Notice of Allowability dated Jan. 7, 2020", 3 pgs.
"U.S. Appl. No. 14/314,312, Notice of Allowance dated Oct. 25, 2019", 9 pgs.
"U.S. Appl. No. 16/298,721, Final Office Action dated Mar. 6, 2020", 54 pgs.
"U.S. Appl. No. 16/298,721, Non Final Office Action dated Oct. 3, 2019", 40 pgs.
"U.S. Appl. No. 16/298,721, Response filed Jan. 3, 2020 to Non Final Office Action dated Oct. 3, 2019", 10 pgs.
U.S. Appl. No. 14/314,312 U.S. Pat. No. 10,586,570, filed Jun. 25, 2014, Method for Real Time Video Processing for Changing Proportions of an Object in the Video.
U.S. Appl. No. 16/749,708, filed Jan. 22, 2020, Real Time Video Processing for Changing Proportions of an Object in the Video.
U.S. Appl. No. 14/325,477 U.S. Pat. No. 9,396,525, filed Jul. 8, 2014, Method for Real Time Video Processing Involving Changing a Color of an Object on a Human Face in a Video.
U.S. Appl. No. 15/208,973 U.S. Pat. No. 10,255,948, filed Jul. 13, 2016, Method for Real Time Video Processing Involving Changing a Color of an Object on a Human Face in a Video.

(56) References Cited

OTHER PUBLICATIONS

U.S. Appl. No. 16/277,750, filed Feb. 15, 2019, Method for Real Time Video Processing Involving Changing a Color of an Object on a Human Face in a Video.
U.S. Appl. No. 15/921,282 U.S. Pat. No. 10,566,026, filed Mar. 14, 2018, Method for Real-Time Video Processing Involving Changing Features of an Object in the Video.
U.S. Appl. No. 14/314,324 U.S. Pat. No. 9,928,874, filed Jun. 25, 2014, Method for Real-Time Video Processing Involving Changing Features of an Object in the Video.
U.S. Appl. No. 14/314,334 U.S. Pat. No. 10,438,631, filed Jun. 25, 2014, Method for Real-Time Video Processing Involving Retouching of an Object in the Video.
U.S. Appl. No. 16/548,279, filed Aug. 22, 2019, Method for Real-Time Video Processing Involving Retouching of an Object in the Video.
U.S. Appl. No. 14/314,343 U.S. Pat. No. 10,283,162, filed Jun. 25, 2014, Method for Triggering Events in a Video.
U.S. Appl. No. 16/298,721, filed Mar. 11, 2019, Method for Triggering Events in a Video.
"U.S. Appl. No. 16/298,721, Response filed Apr. 23, 2020 to Final Office Action dated Mar. 6, 2020", 11 pgs.
"U.S. Appl. No. 16/298,721, Advisory Action dated May 12, 2020", 3 pgs.
"U.S. Appl. No. 16/298,721, Non Final Office Action dated Jul. 24, 2020", 80 pgs.
"U.S. Appl. No. 16/277,750, Non Final Office Action dated Aug. 5, 2020", 8 pgs.
"U.S. Appl. No. 16/298,721, Examiner Interview Summary dated Oct. 20, 2020", 3 pgs.
"U.S. Appl. No. 16/298,721, Response filed Oct. 22, 2020 to Non Final Office Action dated Jul. 24, 2020", 13 pgs.
"U.S. Appl. No. 16/277,750, Response filed Nov. 5, 2020 to Non Final Office Action dated Aug. 5, 2020", 27 pgs.
"U.S. Appl. No. 16/298,721, Notice of Allowance dated Nov. 10, 2020", 5 pgs.
"U.S. Appl. No. 14/661,367, Non Final Office Action dated May 5, 2015", 30 pgs.
"U.S. Appl. No. 14/661,367, Notice of Allowance dated Aug. 31, 2015", 5 pgs.
"U.S. Appl. No. 14/661,367. Response filed Aug. 5, 2015 to Non Final Office Action dated May 5, 2015", 17 pgs.
"U.S. Appl. No. 14/987,514, Final Office Action dated Sep. 26, 2017", 25 pgs.
"U.S. Appl. No. 14/987,514, Non Final Office Action dated Jan. 18, 2017", 35 pgs.
"U.S. Appl. No. 14/987,514, Notice of Allowance dated Jun. 29, 2018", 9 pgs.
"U.S. Appl. No. 14/987,514, Response filed Feb. 26, 2018 to Final Office Action dated Sep. 26, 2017", 15 pgs.
"U.S. Appl. No. 14/987,514, Response filed Jul. 18, 2017 to Non Final Office Action dated Jan. 18, 2017", 15 pgs.
"U.S. Appl. No. 16/141,588, Advisory Action dated Jan. 27, 2021", 3 pgs.
"U.S. Appl. No. 16/141,588, Advisory Action dated Jul. 20, 2020", 3 pgs.
"U.S. Appl. No. 16/141,588, Ex Parte Quayle Action mailed Jun. 25, 2021", 4 pgs.
"U.S. Appl. No. 16/141,588, Examiner Interview Summary dated Apr. 22, 2021", 2 pgs.
"U.S. Appl. No. 16/141,588, Final Office Action dated Apr. 7, 2020", 34 pgs.
"U.S. Appl. No. 16/141,588, Final Office Action dated Nov. 16, 2020", 35 pgs.
"U.S. Appl. No. 16/141,588, Non Final Office Action dated Mar. 10, 2021", 37 pgs.
"U.S. Appl. No. 16/141,588, Non Final Office Action dated Aug. 27, 2020", 34 pgs.
"U.S. Appl. No. 16/141,588, Non Final Office Action dated Dec. 9, 2019", 25 pgs.
"U.S. Appl. No. 16/141,588, Notice of Allowance dated Oct. 20, 2021", 5 pgs.
"U.S. Appl. No. 16/141,588, Response filed Jan. 18, 2021 to Final Office Action dated Nov. 16, 2020", 10 pgs.
"U.S. Appl. No. 16/141,588, Response filed Mar. 6, 2020 to Non Final Office Action dated Dec. 9, 2019", 11 pgs.
"U.S. Appl. No. 16/141,588, Response filed Jun. 9, 2021 to Non Final Office Action dated Mar. 10, 2021", 10 pages.
"U.S. Appl. No. 16/141,588, Response filed Jul. 7, 2020 to Final Office Action dated Apr. 7, 2020", 12 pgs.
"U.S. Appl. No. 16/141,588, Response filed Sep. 27, 2021 to Ex Parte Quayle Action mailed Jun. 25, 2021", 8 pages.
"U.S. Appl. No. 16/141,588, Response filed Oct. 13, 2020 to Non Final Office Action dated Aug. 27, 2020", 12 pgs.
"U.S. Appl. No. 16/277,750, Notice of Allowance dated Nov. 30, 2020", 5 pgs.
"U.S. Appl. No. 16/277,750, PTO Response to Rule 312 Communication dated Mar. 30, 2021", 2 pgs.
"U.S. Appl. No. 16/277,750, Supplemental Notice of Allowability dated Dec. 28, 2020", 2 pgs.
"U.S. Appl. No. 16/298,721, PTO Response to Rule 312 Communication dated Feb. 4, 2021", 2 pgs.
"U.S. Appl. No. 16/548,279, Advisory Action dated Jul. 23, 2021", 3 pgs.
"U.S. Appl. No. 16/548,279, Final Office Action dated May 21, 2021", 24 pgs.
"U.S. Appl. No. 16/548,279, Non Final Office Action dated Mar. 1, 2021", 26 pgs.
"U.S. Appl. No. 16/548,279, Non Final Office Action dated Aug. 4, 2021", 23 pgs.
"U.S. Appl. No. 16/548,279, Response filed May 5, 2021 to Non Final Office Action dated Mar. 1, 2021", 11 pgs.
"U.S. Appl. No. 16/548,279, Response filed Jul. 16, 2021 to Final Office Action dated May 21, 2021", 10 pgs.
"U.S. Appl. No. 16/749,708, Non Final Office Action dated Jul. 30, 2021", 29 pgs.
"U.S. Appl. No. 14/987,514, Preliminary Amendment filed Jan. 4, 2016", 3 pgs.
"Chinese Application Serial No. 201680028853.3, Office Action dated Apr. 2, 2021", w/English translation, 10 pgs.
"Chinese Application Serial No. 201680028853.3, Office Action dated May 6, 2020", w/English Translation, 22 pgs.
"Chinese Application Serial No. 201680028853.3, Office Action dated Aug. 19, 2019", w/English Translation, 20 pgs.
"Chinese Application Serial No. 201680028853.3, Office Action dated Dec. 1, 2020", w/English Translation, 20 pgs.
"Chinese Application Serial No. 201680028853.3, Response filed Jun. 23, 2020 to Office Action dated May 6, 2020", w/ English Claims, 17 pgs.
"Chinese Application Serial No. 201680028853.3, Response filed Dec. 6, 2019 to Office Action dated Aug. 19, 2019", w/ English Claims, 16 pgs.
"Chinese Application Serial No. 201680028853.3, Response filed Feb. 4, 2021 to Office Action dated Dec. 1, 2020", w/ English Claims, 17 pgs.
"European Application Serial No. 16716975.4, Communication Pursuant to Article 94(3) EPC dated Mar. 31, 2020", 8 pgs.
"European Application Serial No. 16716975.4, Response filed May 4, 2018 to Communication pursuant to Rules 161(1) and 162 EPC dated Oct. 25, 2017", w/ English Claims, 116 pgs.
"European Application Serial No. 16716975.4, Response Filed Jul. 31, 2020 to Communication Pursuant to Article 94(3) EPC dated Mar. 31, 2020", 64 pgs.
"European Application Serial No. 16716975.4, Summons to Attend Oral Proceedings mailed Apr. 16, 2021", 11 pgs.
"European Application Serial No. 16716975.4, Summons to Attend Oral Proceedings mailed Sep. 15, 2021", 4 pgs.
"European Application Serial No. 16716975.4, Written Submissions filed Aug. 10, 2021 to Summons to Attend Oral Proceedings mailed Apr. 16, 2021", 62 pgs.
"International Application Serial No. PCT/US2016/023046, International Preliminary Report on Patentability dated Sep. 28, 2017", 8 pgs.

(56) References Cited

OTHER PUBLICATIONS

"International Application Serial No. PCT/US2016/023046, International Search Report dated Jun. 29, 2016", 4 pgs.

"International Application Serial No. PCT/US2016/023046, Written Opinion dated Jun. 29, 2016", 6 pgs.

"Korean Application Serial No. 10-2017-7029496, Notice of Preliminary Rejection dated Jan. 29, 2019", w/English Translation, 11 pgs.

"Korean Application Serial No. 10-2017-7029496, Response filed Mar. 28, 2019 to Notice of Preliminary Rejection dated Jan. 29, 2019", w/ English Claims, 28 pgs.

"Korean Application Serial No. 10-2019-7029221, Notice of Preliminary Rejection dated Jan. 6, 2020", w/ English Translation, 13 pgs.

"Korean Application Serial No. 10-2019-7029221, Response filed Mar. 6, 2020 to Notice of Preliminary Rejection dated Jan. 6, 2020", w/ English Claims, 19 pgs.

"Korean Application Serial No. 10-2020-7031217, Notice of Preliminary Rejection dated Jan. 21, 2021", w/ English Translation, 9 pgs.

"Korean Application Serial No. 10-2020-7031217, Response filed May 6, 2021 to Notice of Preliminary Rejection dated Jan. 21, 2021", w/ English Claims, 20 pgs.

Kuhl, Annika, et al., "Automatic Fitting of a Deformable Face Mask Using a Single Image", Computer Vision/Computer Graphics Collaboration Techniques, Springer, Berlin, (May 4, 2009), 69-81.

Pham, Hai, et al., "Hybrid On-line 3D Face and Facial Actions Tracking in RGBD Video Sequences", International Conference on Pattern Recognition, IEEE Computer Society, US, (Aug. 24, 2014), 4194-4199.

Viola, Paul, et al., "Rapid Object Detection using a Boosted Cascade of Simple Features", IEEE Conference on Computer Vision and Pattern Recognition (CVPR), (2001), 511-518.

"U.S. Appl. No. 16/141,588, Corrected Notice of Allowability dated Oct. 26, 2021", 2 pgs.

"U.S. Appl. No. 16/141,588, Corrected Notice of Allowability dated Dec. 1, 2021", 2 pgs.

"U.S. Appl. No. 16/141,588, Notice of Allowance dated Nov. 16, 2021", 5 pgs.

"U.S. Appl. No. 16/548,279, Advisory Action dated Jan. 13, 2022", 4 pgs.

"U.S. Appl. No. 16/548,279, Final Office Action dated Nov. 12, 2021", 31 pgs.

"U.S. Appl. No. 16/548,279, Response filed Jan. 5, 2022 to Final Office Action dated Nov. 12, 2021", 12 pgs.

"U.S. Appl. No. 16/548,279, Response filed Nov. 1, 2021 to Non Final Office Action dated Aug. 4, 2021", 11 pgs.

"U.S. Appl. No. 16/749,708, Final Office Action dated Nov. 15, 2021", 35 pgs.

"U.S. Appl. No. 16/749,708, Notice of Allowance dated Jan. 21, 2022", 13 pgs.

"U.S. Appl. No. 16/749,708, Response filed Jan. 7, 2022 to Final Office Action dated Nov. 15, 2021", 11 pgs.

"U.S. Appl. No. 16/749,708, Response filed Oct. 28, 2021 to Non Final Office Action dated Jul. 30, 2021", 12 pgs.

"U.S. Appl. No. 17/248,812, Non Final Office Action dated Nov. 22, 2021", 39 pgs.

"Chinese Application Serial No. 201680028853.3, Notice of Reexamination dated Nov. 25, 2021", w/ English translation, 36 pgs.

Forlenza, Lidia, et al., "Real Time Corner Detection for Miniaturized Electro-Optical Sensors Onboard Small Unmanned Aerial Systems", Sensors, 12(1), (2012), 863-877.

"U.S. Appl. No. 16/548,279, Non Final Office Action dated Feb. 17, 2022", 37 pgs.

"U.S. Appl. No. 17/248,812, Notice of Allowance dated Mar. 23, 2022", 5 pgs.

"U.S. Appl. No. 17/248,812, Response filed Feb. 18, 2022 to Non Final Office Action dated Nov. 22, 2021", 12 pgs.

Li, Yongqiang, et al., "Simultaneous Facial Feature Tracking and Facial Expression Recognition", IEEE Transactions on Image Processing, 22(7), (Jul. 2013), 2559-2573.

"U.S. Appl. No. 16/749,708, Notice of Allowance dated May 13, 2022", 5 pgs.

"U.S. Appl. No. 16/548,279, Response filed May 16, 2022 to Non Final Office Action dated Feb. 17, 2022", 15 pgs.

"U.S. Appl. No. 16/548,279, Notice of Allowance dated Jun. 3, 2022", 31 pgs.

"U.S. Appl. No. 16/548,279, Supplemental Notice of Allowability dated Jun. 15, 2022", 2 pgs.

"U.S. Appl. No. 17/248,812, Notice of Allowance dated Jul. 29, 2022", 5 pgs.

\* cited by examiner

METHOD FOR REAL-TIME VIDEO PROCESSING INVOLVING CHANGING FEATURES OF AN OBJECT IN THE VIDEO

CROSS-REFERENCE TO RELATED APPLICATIONS

This application is a continuation of, and claims the benefit of U.S. patent application Ser. No. 15/921,282, filed on Mar. 14, 2018, which is a continuation of, and claims the benefit of U.S. patent application Ser. No. 14/314,324, filed on Jun. 25, 2014, which claims the benefit of U.S. Provisional Application Ser. No. 61/936,016, filed on Feb. 5, 2014.

BACKGROUND OF THE INVENTION

Technical Field

The disclosed embodiments relate generally to the field of real-time video processing. In particular, the disclosed embodiments relate to a computerized system and a method for real-time video processing that involves changing features of an object in a video.

Description of the Related Art

At the present time some programs can provide processing of still images. For example, U.S. Patent Application Publication No. US2007268312, incorporated herein by reference, discloses a method of replacing face elements by some components that is made by users for real-time video. However, it is not possible to process real time video in such a way that an object shown in real time video can be modified in real time naturally with some effects. In case of a human's face such effects can include making a face younger/older and etc.

Thus, new and improved systems and methods are needed that would enable real time video stream processing that involves changing features of an object in the video stream.

SUMMARY OF INVENTION

The embodiments described herein are directed to systems and methods that substantially obviate one or more of the above and other problems associated with the conventional technology for real time video stream processing. In accordance with one aspect of the embodiments described herein, there is provided a method for real-time video processing for changing features of an object in a video, the method comprises: providing an object in the video, the object being at least partially and at least occasionally presented in frames of the video; detecting the object in the video; generating a list of at least one element of the object, the list being based on the object's features to be changed according to a request for modification; detecting the at least one element of the object in the video; tracking the at least one element of the object in the video; and transforming the frames of the video such that the at least one element of the object is modified according to the request for modification.

In one or more embodiments, transforming the frames of the video comprises: calculating characteristic points for each of the at least one element of the object; generating a mesh based on the calculated characteristic points for each of the at least one element of the object; tracking the at least one element of the object in the video, wherein tracking comprises aligning the mesh for each of the at least one element with a position of the corresponding each of the at least one element from frame to frame; generating a set of first points on the mesh for each of the at least one element of the object based on the request for modification; generating a set of second points on the mesh based on the set of first points and the request for modification; and transforming the frames of the video such that the at least one element of the object is modified, wherein, for each of the at least one element of the object, the set of first points comes into the set of second points using the mesh In one or more embodiments, the computer-implemented method further comprises: generating a square grid associated with the background of the object in the video; and transforming the background of the object using the square grid in accordance with the modification of the at least one element of the object.

In one or more embodiments, the computer-implemented method further comprises: generating at least one square grid associated with regions of the object that are adjacent to the modified at least one element of the object; and modifying the regions of the object that are adjacent to the modified at least one element of the object in accordance with the modification of the at least one element of the object using the at least one square grid.

In one or more embodiments, the detecting of the object in the video is implemented with the use of Viola-Jones method.

In one or more embodiments, calculating of the object's characteristic points is implemented with the use of an Active Shape Model (ASM).

In one or more embodiments, transforming the frames of the video comprises: calculating characteristic points for each of the at least one element of the object; generating a mesh based on the calculated characteristic points for each of the at least one element of the object; generating a set of first points on the mesh for each of the at least one element of the object based on the request for modification; generating at least one area based on the set of first points for each of the at least one element of the object; tracking the at least one element of the object in the video, wherein the tracking comprises aligning the at least one area of each of the at least one element with a position of the corresponding each of the at least one element from frame to frame; transforming the frames of the video such that the properties of the at least one area are modified based on the request for modification.

In one or more embodiments, modification of the properties of the at least one area includes changing color of the at least one area.

In one or more embodiments, modification of the properties of the at least one area includes removing at least part of the at least one area from the frames of the video.

In one or more embodiments, modification of the properties of at least one area includes adding at least one new object to the at least one area, the at least one new object is based on the request for modification.

In one or more embodiments, objects to be modified include a human's face.

In one or more embodiments, the processed video comprises a video stream.

In accordance with another aspect of the embodiments described herein, there is provided a mobile computerized system comprising a central processing unit and a memory, the memory storing instructions for: providing an object in the video, the object being at least partially and at least occasionally presented in frames of the video; detecting the object in the video; generating a list of at least one element of the object, the list being based on the object's features to be changed according to a request for modification; detecting the at least one element of the object in the video; tracking the at least one element of the object in the video; and transforming the frames of the video such that the at least one element of the object is modified according to the request for modification.

In one or more embodiments, transforming the frames of the video comprises: calculating characteristic points for each of the at least one element of the object; generating a mesh based on the calculated characteristic points for each of the at least one element of the object; tracking the at least one element of the object in the video, wherein tracking comprises aligning the mesh for each of the at least one element with a position of the corresponding each of the at least one element from frame to frame; generating a set of first points on the mesh for each of the at least one element of the object based on the request for modification; generating a set of second points on the mesh based on the set of first points and the request for modification; and transforming the frames of the video such that the at least one element of the object is modified, wherein, for each of the at least one element of the object, the set of first points comes into the set of second points using the mesh.

In one or more embodiments, the computer-implemented method further comprises: generating a square grid associated with the background of the object in the video; and transforming the background of the object using the square grid in accordance with the modification of the at least one element of the object.

In one or more embodiments, the computer-implemented method further comprises: generating at least one square grid associated with regions of the object that are adjacent to the modified at least one element of the object; and modifying the regions of the object that are adjacent to the modified at least one element of the object in accordance with the modification of the at least one element of the object using the at least one square grid.

In one or more embodiments, the detecting of the object in the video is implemented with the use of Viola-Jones method.

In one or more embodiments, calculating of the object's characteristic points is implemented with the use of an Active Shape Model (ASM).

In one or more embodiments, transforming the frames of the video comprises: calculating characteristic points for each of the at least one element of the object; generating a mesh based on the calculated characteristic points for each of the at least one element of the object; generating a set of first points on the mesh for each of the at least one element of the object based on the request for modification; generating at least one area based on the set of first points for each of the at least one element of the object; tracking the at least one element of the object in the video, wherein the tracking comprises aligning the at least one area of each of the at least one element with a position of the corresponding each of the at least one element from frame to frame; transforming the frames of the video such that the properties of the at least one area are modified based on the request for modification.

In one or more embodiments, modification of the properties of the at least one area includes changing color of the at least one area.

In one or more embodiments, modification of the properties of the at least one area includes removing at least part of the at least one area from the frames of the video.

In one or more embodiments, modification of the properties of at least one area includes adding at least one new object to the at least one area, the at least one new object is based on the request for modification.

In one or more embodiments, objects to be modified include a human's face.

BRIEF DESCRIPTION OF DRAWINGS

The accompanying drawings, which are incorporated in and constitute a part of this specification exemplify the embodiments of the present invention and, together with the description, serve to explain and illustrate principles of the inventive technique. Specifically.

DETAILED DESCRIPTION

In the following detailed description, reference will be made to the accompanying drawing(s), in which identical functional elements are designated with like numerals. The aforementioned accompanying drawings show by way of illustration and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense. Additionally, the various embodiments of the invention as described may be implemented in the form of a software running on a general purpose computer, in the form of a specialized hardware, or combination of software and hardware.

It will be appreciated that the method for real time video processing can be performed with any kind of video data, e.g. video streams, video files saved in a memory of a computerized system of any kind (such as mobile computer devices, desktop computer devices and others), and all other possible types of video data understandable for those skilled in the art. Any kind of video data can be processed, and the embodiments disclosed herein are not intended to be limiting the scope of the present invention by indicating a certain type of video data.

The embodiments disclosed further are aimed for processing of video streams, however all other types of video data including video files saved in a memory of a computerized system can be processed by the methods of the present invention. For example, a user can load video files and save them in a memory of his computerized system and such video files can be also processed by the methods of the present invention. In accordance with one aspect of the embodiments described herein, there is provided a computerized system and a computer-implemented method for processing a real-time video stream that involves changing features of an object in the video stream. The described method may be implemented using any kind of computing device including desktops, laptops, tablet computers, mobile phones, music players, multimedia players etc. having any kind of generally used operational system such as Windows®, iOS®, Android® and others. All disclosed embodiments and examples are non-limiting to the invention and disclosed for illustrative purposes only.

It is important to note that any objects can be processed by the embodiments of the described method, including, without limitation, such objects as a human's face and parts of a human body, animals, and other living creatures or non-living things which images can be transported in a real-time video stream.

Figure 1:
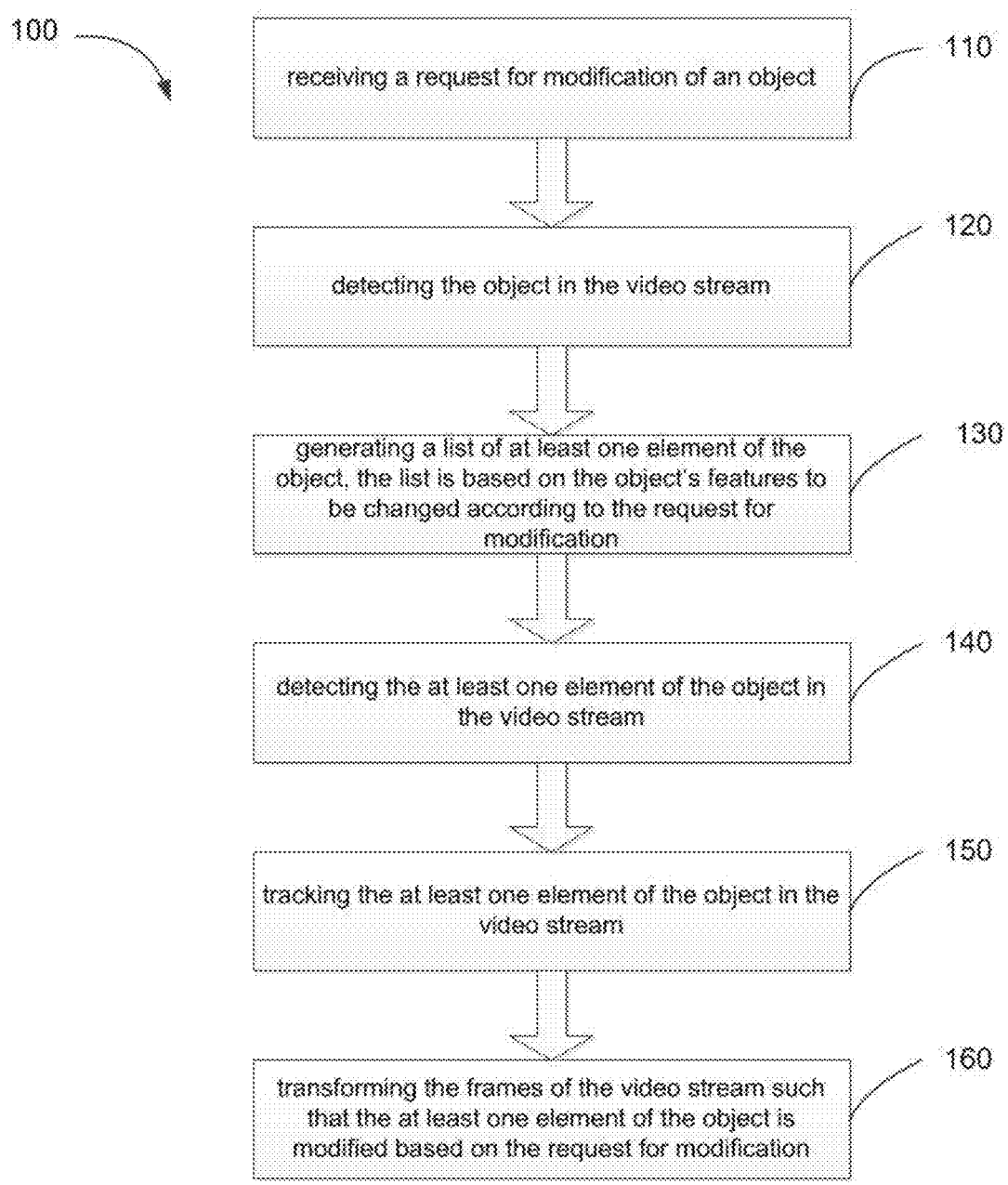
FIG. 1 illustrates a method for real-time video processing for changing features of an object in a video according to the first embodiment of the invention.

The method 100 according to the first embodiment of the invention is illustrated in FIG. 1. The method 100 is preferably used for an object in a video stream that at least partially and at least occasionally presented in frames of the video stream. In other words, the method 100 is applicable for those objects that are not presented in frames of a video stream all the time. According to the method 100 a request for modification of the object including changing its features is received (stage 110). The mentioned request can be issued by a user having a relation to a video stream, a system enabling a process of the video stream, or by any other source.

Next, the object from the request for modification is detected in the video stream (stage 120), for example 5 with the use of the conventional Viola-Jones method, and the request for modification is analyzed by generating a list having one or more elements of the object (stage 130) such that the mentioned list is based on the object's features that must be changed according to the request.

Further, in one or more embodiments, the elements of the object are detected (stage 140) and tracked (stage 150) in the video stream.

Finally, in one or more embodiments, the elements of the object are modified according to the request for modification, thus transforming the frames of the video stream (stage 160).

It shall be noted that transformation of frames of a video stream can be performed by different methods for different kinds of transformation. For example, for transformations of frames mostly referring to changing forms of object's elements the second embodiment of the invention can be used. According to the second embodiment, primarily characteristic points for each of element of an object are calculated. Hereinafter characteristic points refer to points of an object which relate to its elements used in changing features of this object. It is possible to calculate characteristic points with the use of an Active Shape Model (ASM) or other known methods. Then, a mesh based on the characteristic points is generated for each of the at least one element of the object. This mesh used in the following stage of tracking the elements of the object in the video stream. In particular in the process of tracking the mentioned mesh for each element is aligned with a position of each element. Further, two sets additional points are generated on the mesh, namely a set of first points and a set of second points. The set of first points is generated for each element based on a request for modification, and the set of second points is generated for each element based on the set of first points and the request for modification. Then, the frames of the video stream can be transformed by modifying the elements of the object on the basis of the sets of first and second points and the mesh.

In such method a background of the modified object can be changed or distorted. Thus, to prevent such effect it is possible to generate a square grid associated with the background of the object and to transform the background of the object based on modifications of elements of the object using the square grid.

As it can be understood by those skilled in the art, not only the background of the object but also some its regions adjacent to the modified elements can be changed or distorted. Here, one or several square grids associated with the mentioned regions of the object can be generated, and the regions can be modified in accordance with the modification of elements of the object by using the generated square grid or several square grids.

In one or more embodiments, transformations of frames referring to changing some areas of an object using its elements can be performed by the third embodiment of the invention that is similar to the third embodiment. More specifically, transformation of frames according to the third embodiment begins with calculating of characteristic points for each element of an object and generating a mesh based on the calculated characteristic points. After that a set of first points is generated on the mesh for each element of the object on the basis of a request for modification. Then one or more areas based on the set of first points are generated for each element. Finally, the elements of the object are tracked by aligning the area for each element with a position for each of the at least one element, and properties of the areas can be modified based on the request for modification, thus transforming the frames of the video stream.

According to the nature of the request for modification properties of the mentioned areas can be transformed in different ways:
 changing color of areas;
 removing at least some part of areas from the frames of the video stream;
 including one or more new objects into areas which are based on a request for modification.

It should be noted that different areas or different parts of such areas can be modified in different ways as mentioned above, and properties of the mentioned areas can be also modified in a different manner other then the specific exemplary modifications described above and apparent for those skilled in the art.

Face detection and face tracking are discussed below in greater detail.

Face Detection and Initialization

In one or more embodiments, first, in the algorithm for changing proportion a user sends a request for changing proportions of an object in a video stream. The next step in the algorithm involves detecting the object in the video stream.

In one or more embodiments, the face is detected on an image with use of Viola-Jones method. Viola-Jones method is a fast and quite accurate method used to detect the face region. Then, an Active Shape Model (ASM) algorithm is applied to the face region of an image to detect facial feature reference points. However, it should be appreciated that other methods and algorithms suitable for face detection can be used.

Figure 2:
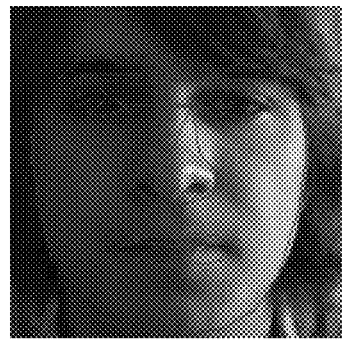
FIG. 2 illustrates facial feature reference points detected by an ASM algorithm used in the method according to one embodiment of the present invention.
Figure 2:
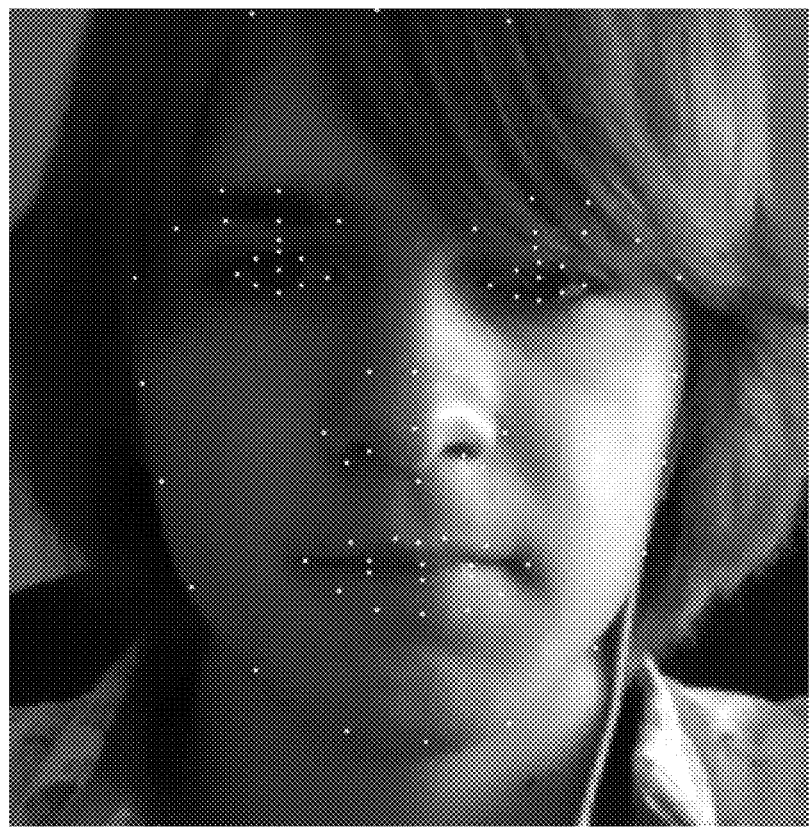

In one or more embodiments, for locating facial features locating of landmarks is used. A landmark represents a distinguishable point present in most of the images under consideration, for example, the location of the left eye pupil (FIG. 2).

In one or more embodiments, a set of landmarks forms a shape. Shapes are represented as vectors: all the x- followed by all the y-coordinates of the points in the shape. One shape is aligned to another with a similarity transform (allowing translation, scaling, and rotation) that minimizes the average Euclidean distance between shape points. The mean shape is the mean of the aligned training shapes (which in the present disclosure are manually landmarked faces).

In one or more embodiments, subsequently, in accordance with the ASM algorithm, the search for landmarks from the mean shape aligned to the position and size of the face determined by a global face detector is started. It then repeats the following two steps until convergence (i) suggest a tentative shape by adjusting the locations of shape points by template matching of the image texture around each point (ii) conform the tentative shape to a global shape model. The individual template matches are unreliable and the shape model pools the results of the weak template matchers to form a stronger overall classifier. The entire search is repeated at each level in an image pyramid, from coarse to fine resolution. It follows that two types of sub-model make up the ASM: the profile model and the shape model.

In one or more embodiments, the profile models (one for each landmark at each pyramid level) are used to locate the approximate position of each landmark by template matching. Any template matcher can be used, but the classical ASM forms a fixed-length normalized gradient vector (called the profile) by sampling the image along a line (called the whisker) orthogonal to the shape boundary at the landmark. During training on manually landmarked faces, at each landmark the mean profile vector g and the profile covariance matrix Sg are calculated. During searching, the landmark along the whisker to the pixel whose profile g has lowest Mahalanobis distance from the mean profile g is displaced, where the $$\text{MahalanobisDistance} = (g-\bar{g})^T S_g^{-1}(g-\bar{g}) \quad (1)$$

The shape model specifies allowable constellations of landmarks. It generates a shape $\hat{x}$ with $$\hat{x} = \bar{x} + \Phi b \quad (2)$$

where $\hat{x}$ is the mean shape, is a parameter vector, and _ is a matrix of selected eigenvectors of the covariance matrix Sg of the points of the aligned training shapes. Using a standard principal components approach, model has as much variation in the training set as it is desired by ordering the eigenvalues λi of Ss and keeping an appropriate number of the corresponding eigenvectors in Φ. In the method, a single shape model for the entire ASM is used but it is scaled for each pyramid level.

Then the Equation 2 is used to generate various shapes by varying the vector parameter b. By keeping the elements of b within limits (determined during model building) it is possible to ensure that generated face shapes are lifelike.

Conversely, given a suggested shape x, it is possible to calculate the parameter b that allows Equation 2 to best approximate x with a model shape $\hat{x}$. An iterative algorithm, described by Cootes and Taylor, that gives the b and T that minimizes $$\text{distance}(x, T(\bar{x}+\Phi b)) \quad (3)$$

where T is a similarity transform that maps the model space into the image space is used.

In one or more embodiments, mapping can be built from facial feature reference points, detected by ASM, to Candide-3 point, and that gives us Candide-3 points x and y coordinates. Candide is a parameterised face mask specifically developed for model-based coding of human faces. Its low number of polygons (approximately 100) allows fast reconstruction with moderate computing power. Candide is controlled by global and local Action Units (AUs). The global ones correspond to rotations around three axes. The local Action Units control the mimics of the face so that different expressions can be obtained.

The following equation system can be made, knowing Candide-3 points x and y coordinates.

$$\sum_{j=1}^{m} X_{ij} * B_j = x_i, \quad (4)$$

$$\sum_{j=1}^{m} Y_{ij} * B_j = y_i, \quad (5)$$

where—j-th shape unit, xi, yi—i-th point coordinates, Xjj, Yij—coefficients, which denote how the i-th point coordinates are changed by j-th shape unit. In this case, this system is overdetermined, so it can be solved precisely. Thus, the following minimization is made:

$$\left(\sum_{j=1}^{m} X_{ij}*B_j = x_i\right)^2 + \left(\sum_{j=1}^{m} Y_{ij}*B_j = y_i\right)^2 \to \quad (6)$$

$$\min\left(\sum_{j=1}^{m} X_{ij}*B_j = x_i\right)^2 + \left(\sum_{j=1}^{m} Y_{ij}*B_j = y_i\right)^2 \to \min.$$

Let's denote $$X=((X_{ij})^T,(Y_{ij})^T)^T, \; x=((x_i)^T,(y_i)^T)^T, \; B=(B_j)^T. \quad (7)$$

This equation system is linear, so it's solution is $$B=(X^TX)^{-1}X^Tx \quad (8)$$

In one or more embodiments, it is also possible to use Viola-Jones method and ASM to improve tracking quality. Face tracking methods usually accumulate error over time, so they can lose face position after several hundred frames. In order to prevent it, in the present invention the ASM algorithm is run from time to time to re-initialize tracking algorithm.

Face Tracking

Figure 3:
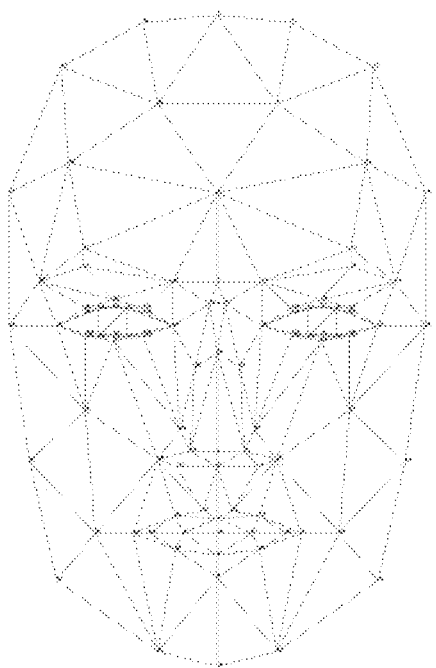
FIG. 3 illustrates Candide-3 model used in the method according to one embodiment of the present invention.

In one or more embodiments, the next step comprises tracking the detected object in the video stream. In the present invention the abovementioned Candide-3 model is used (see Ahlberg, J.: Candide-3, an updated parameterized face. Technical report, Linköping University, Sweden (2001)), incorporated herein by reference, for tracking face in a video stream). The mesh or mask corresponding to Candide-b 3 model is shown in FIG. 3.

In one or more embodiments, a state of the model can be described by shape units intensity vector, action units intensity vector and a position-vector. Shape units are some main parameters of a head and a face. In the present invention next 10 units are used:

Eyebrows vertical position
Eyes vertical position
Eyes width
Eyes height
Eye separation distance
Nose vertical position
Nose pointing up
Mouth vertical position Mouth width Chin width In one or more embodiments, action units are face parameters that correspond to some face movement. In the present invention next 7 units are used:

Upper lip raiser

Jaw drop

Up stretcher

Left brow lowerer

Bight brow lowerer

Lip corner depressor

Outer brow raiser

Figure 4A:
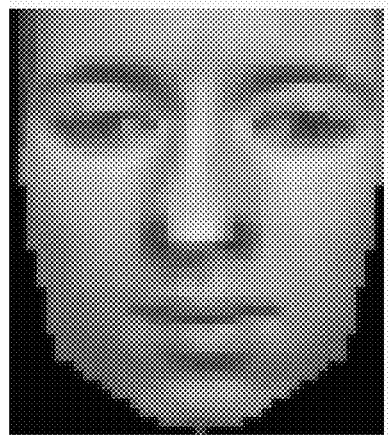
FIG. 4a and FIG. 4b show an example of a mean face (a) and an example of a current observation.
Figure 4B:
Figure 5:
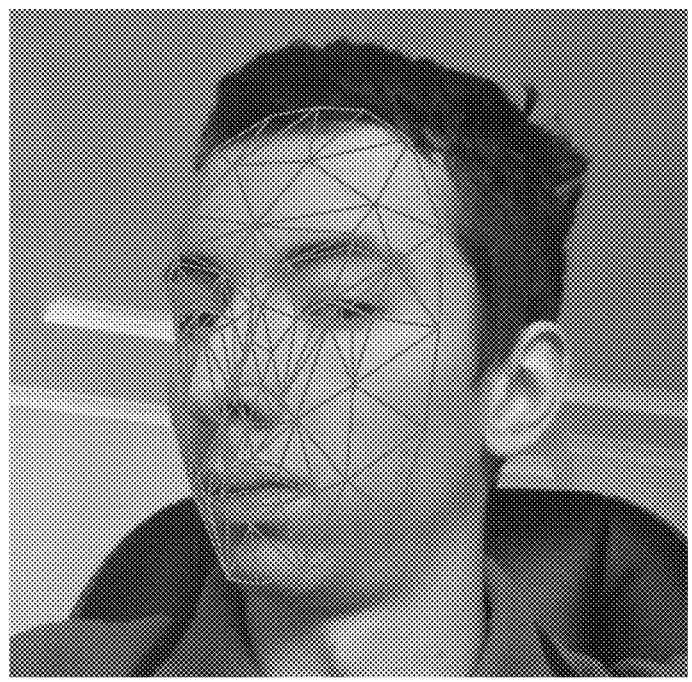
FIG. 5 illustrates Candide at a frame used in the method according to one embodiment of the present invention.

In one or more embodiments, the mask position at a picture can be described by using 6 coordinates: yaw, pitch, roll, x, y, scale. The main idea of the algorithm proposed by Dornaika et al. (Dornaika, F., Davoine, F.: On appearance based face and facial action tracking. IEEE Trans. Circuits Syst. Video Technol. 16(9):1107-1124 (2006), incorporated herein by reference) is to find the mask position, which observes the region most likely to be a face. For each position it is possible to calculate the observation error—the value that indicates the difference between image under current mask position and the mean face. An example of the mean face and of the observation under current position is illustrated in FIGS. 4(*a*)-3(*b*). FIG. 4(*b*) corresponds to the observation under the mask shown in FIG. 5.

In one or more embodiments, human face is modeled as a picture with a fixed size (width=40 px, height=46 px) called a mean face. Gaussian distribution that is proposed in the original algorithms has shown worse result in comparison with the static image. So, a difference between the current observation and the mean face is calculated in the following way:

$$e(b) = \Sigma(\log(1+I_m) - \log(1+I_i))^2 \quad (9)$$

Logarithm function makes tracking more stable.

In one or more embodiments, to minimize error, Taylor series is used as it was proposed by Dornaika at. el. (see Dornaika, F., Davoine, F.: On appearance based face and facial action tracking. IEEE Trans. Circuits Syst. Video Technol. 16(9):1107-1124 (2006)). It was found that it is not necessary to sum up a number of finite difference when calculating an approximation to first derivative. Derivative is calculated in the following way:

$$g_{ij} = \frac{W(y_t, b_t + \_b_t)_{ij} - W(y_t, b_t - \_b_t)_{ij}}{-j} \quad (10)$$

Here $g_{ij}$ is an element of matrix G. This matrix has size m*n, where m is large enough (about 1600) and n is small (about 14). In case of straight-forward calculating there have to be done n*m operations of division. To reduce the number of divisions this matrix can be rewritten as a product of two matrices:

$$G = A * B$$

Where matrix A has the same size as G and its element is:

$$a_{ij} = W(y_t, b_t + \_b_t)_{ij} - W(y_t, b_t - \_b_t)_{ij} \quad (11)$$

and matrix B is a diagonal matrix with sizes n*n, and $b_{ii} = \_i^{-1}$

Now Matrix $G_t^+$ has to be obtained and here is a place where a number of divisions can be reduced.

$$G_t^+ = (G^TG)^{-1}G^T = (B^TA^TAB)^{-1}B^TA^T = B^-(A^TA)^{-1}B^-\_1BA^T = B^{-1}(A^TA)^{-1}A^T \quad (12)$$

After that transformation this can be done with n*n divisions instead of m*n.

One more optimization was used here. If matrix is created and then multiplied to $\_ob_t$, it leads to $n*m+n^3$ operations, but if first $A^T$ and $\_ob_t$ are multiplied and then $B^{-1}(A^TA)^{-1}$ with it, there will be only $n*m+n^3$ operations, that is much better because n<<m.

Thus, the step of tracking the detected object in the video stream in the present embodiment comprises creating a mesh that is based on the detected feature reference points of the object and aligning the mesh to the object on each frame.

It should be also noted that to increase tracking speed in the present invention multiplication of matrices is performed in such a way that it can be boosted using ARM advanced SIMD extensions (also known as NEON). Also, the GPU is used instead of CPU whenever possible. To get high performance of the GPU, operations in the present invention are grouped in a special way.

Thus, tracking according to the exemplary embodiment of the invention has the following advantageous features:

1. Before tracking, Logarithm is applied to the grayscale value of each pixel to track it. This transformation has a great impact to tracking performance.

2. In the procedure of gradient matrix creation, the step of each parameter depends on the scale of the mask.

Exemplary Computer Platform

Figure 6:
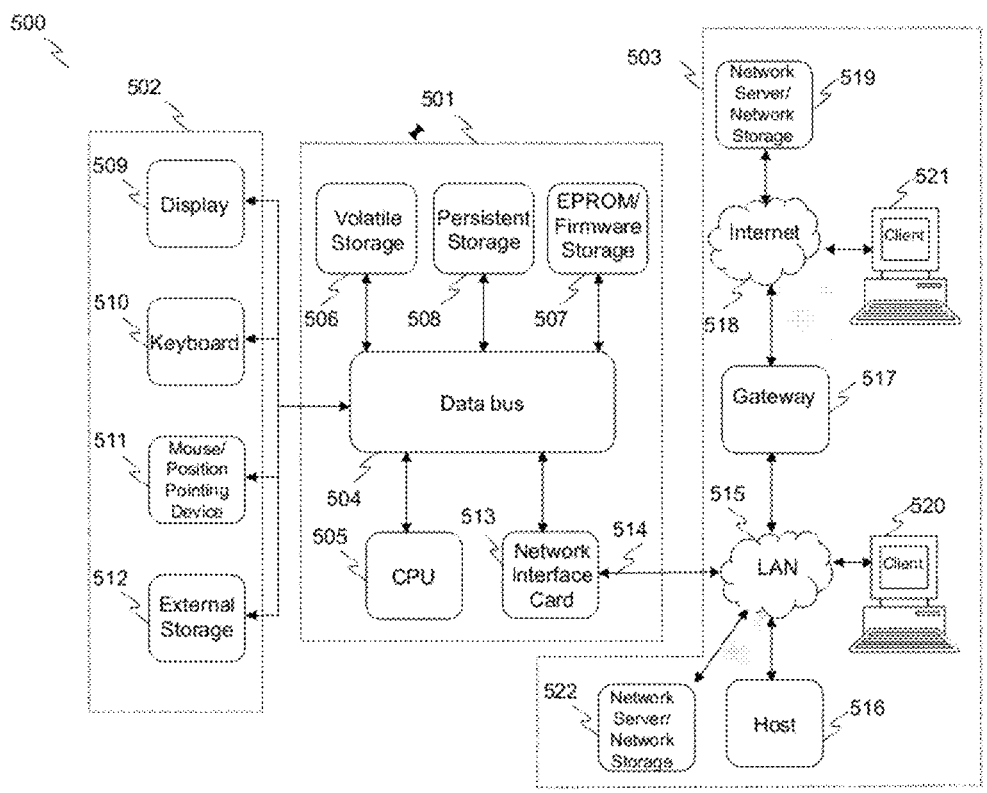
FIG. 6 illustrates an exemplary embodiment of a computer platform based on which the techniques described herein may be implemented.

FIG. 6 is a block diagram that illustrates an embodiment of a computer system 500 upon which various embodiments of the inventive concepts described herein may be implemented. The system 500 includes a computer platform 501, peripheral devices 502 and network resources 503.

The computer platform 501 may include a data bus 504 or other communication mechanism for communicating information across and among various parts of the computer platform 501, and a processor 505 coupled with bus 504 for processing information and performing other computational and control tasks. Computer platform 501 also includes a volatile storage 506, such as a random access memory (RAM) or other dynamic storage device, coupled to bus 504 for storing various information as well as instructions to be executed by processor 505, including the software application for implementing multifunctional interaction with elements of a list using touch-sensitive devices described above. The volatile storage 506 also may be used for storing temporary variables or other intermediate information during execution of instructions by processor 505. Computer platform 501 may further include a read only memory (ROM or EPROM) 507 or other static storage device coupled to bus 504 for storing static information and instructions for processor 505, such as basic input-output system (BIOS), as well as various system configuration parameters. A persistent storage device 508, such as a magnetic disk, optical disk, or solid-state flash memory device is provided and coupled to bus 504 for storing information and instructions.

Computer platform 501 may be coupled via bus 504 to a touch-sensitive display 509, such as a cathode ray tube (CRT), plasma display, or a liquid crystal display (LCD), for displaying information to a system administrator or user of the computer platform 501. An input device 510, including alphanumeric and other keys, is coupled to bus 504 for communicating information and command selections to processor 505. Another type of user input device is cursor control device 511, such as a mouse, a trackball, or cursor direction keys for communicating direction information and command selections to processor 505 and for controlling cursor movement on touch-sensitive display 509. This input device typically has two degrees of freedom in two axes, a first axis (e.g., x) and a second axis (e.g., y), that allows the device to specify positions in a plane. To detect user's gestures, the display 509 may incorporate a touchscreen interface configured to detect user's tactile events and send information on the detected events to the processor 505 via the bus 504.

An external storage device 512 may be coupled to the computer platform 501 via bus 504 to provide an extra or removable storage capacity for the computer platform 501. In an embodiment of the computer system 500, the external removable storage device 512 may be used to facilitate exchange of data with other computer systems.

The invention is related to the use of computer system 500 for implementing the techniques described herein. In an embodiment, the inventive system may reside on a machine such as computer platform 501. According to one embodiment of the invention, the techniques described herein are performed by computer system 500 in response to processor 505 executing one or more sequences of one or more instructions contained in the volatile memory 506. Such instructions may be read into volatile memory 506 from another computer-readable medium, such as persistent storage device 508. Execution of the sequences of instructions contained in the volatile memory 506 causes processor 505 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 505 for execution. The computer-readable medium is just one example of a machine-readable medium, which may carry instructions for implementing any of the methods and/or techniques described herein. Such a medium may take many forms, including but not limited to, non-volatile media and volatile media. Non-volatile media includes, for example, optical or magnetic disks, such as the persistent storage device 508. Volatile media includes dynamic memory, such as volatile storage 506.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, a flash drive, a memory card, any other memory chip or cartridge, or any other medium from which a computer can read.

Various forms of computer readable media may be involved in carrying one or more sequences of one or more instructions to processor 505 for execution. For example, the instructions may initially be carried on a magnetic disk from a remote computer. Alternatively, a remote computer can load the instructions into its dynamic memory and send the instructions over a telephone line using a modem. A modem local to computer system can receive the data on the telephone line and use an infra-red transmitter to convert the data to an infra-red signal. An infra-red detector can receive the data carried in the infra-red signal and appropriate circuitry can place the data on the data bus 504. The bus 504 carries the data to the volatile storage 506, from which processor 505 retrieves and executes the instructions. The instructions received by the volatile memory 506 may optionally be stored on persistent storage device 508 either before or after execution by processor 505. The instructions may also be downloaded into the computer platform 501 via Internet using a variety of network data communication protocols well known in the art.

The computer platform 501 also includes a communication interface, such as network interface card 513 coupled to the data bus 504. Communication interface 513 provides a two-way data communication coupling to a network link 514 that is coupled to a local network 515. For example, communication interface 513 may be an integrated services digital network (ISDN) card or a modem to provide a data communication connection to a corresponding type of telephone line. As another example, communication interface 513 may be a local area network interface card (LAN NIC) to provide a data communication connection to a compatible LAN. Wireless links, such as well-known 802.11a, 802.11b, 802.11g and Bluetooth may also used for network implementation. In any such implementation, communication interface 513 sends and receives electrical, electromagnetic or optical signals that carry digital data streams representing various types of information.

Network link 514 typically provides data communication through one or more networks to other network resources. For example, network link 514 may provide a connection through local network 515 to a host computer 516, or a network storage/server 522. Additionally or alternatively, the network link 514 may connect through gateway/firewall 517 to the wide-area or global network 518, such as an Internet. Thus, the computer platform 501 can access network resources located anywhere on the Internet 518, such as a remote network storage/server 519. On the other hand, the computer platform 501 may also be accessed by clients located anywhere on the local area network 515 and/or the Internet 518. The network clients 520 and 521 may themselves be implemented based on the computer platform similar to the platform 501.

Local network 515 and the Internet 518 both use electrical, electromagnetic or optical signals that carry digital data streams. The signals through the various networks and the signals on network link 514 and through communication interface 513, which carry the digital data to and from computer platform 501, are exemplary forms of carrier waves transporting the information.

Computer platform 501 can send messages and receive data, including program code, through the variety of network(s) including Internet 518 and LAN 515, network link 515 and communication interface 513. In the Internet example, when the system 501 acts as a network server, it might transmit a requested code or data for an application program running on client(s) 520 and/or 521 through the Internet 518, gateway/firewall 517, local area network 515 and communication interface 513. Similarly, it may receive code from other network resources.

The received code may be executed by processor 505 as it is received, and/or stored in persistent or volatile storage devices 508 and 506, respectively, or other non-volatile storage for later execution.

Finally, it should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The present invention has been described in relation to particular examples, which are intended in all respects to be illustrative rather than restrictive. Those skilled in the art will appreciate that many different combinations of hardware, software, and firmware will be suitable for practicing the present invention. For example, the described software may be implemented in a wide variety of programming or scripting languages, such as Assembler, C/C++, Objective-C, per, shell, PHP, Java, as well as any now known or later developed programming or scripting language.

Moreover, other implementations of the invention will be apparent to those skilled in the art from consideration of the specification and practice of the invention disclosed herein. Various aspects and/or components of the described embodiments may be used singly or in any combination in the systems and methods for real time video stream processing. It is intended that the specification and examples be considered as exemplary only, with a true scope and spirit of the invention being indicated by the following claims.

What is claimed is:

1. A method, comprising:
   detecting at least a portion of an object in frames of a video;
   obtaining a mean face based on a picture with a fixed size, the mean face being related to the object;
   obtaining a current observation of the object using the video;
   computing an observation error based on a square of a difference between a logarithm of a function of the current observation of the object and the logarithm of the function of the mean face with the fixed size, the portion of the object being detected based on the observation error;
   transforming a feature of the portion of the object within the frames of the video to generate modified frames with a modified feature, the feature associated with an element of the portion of the object and the feature being transformed in the modified frames within the video in which the portion of the object is detected while the video is provided at a computing device and the portion of the object is detected in the video; and
   providing the modified frames including the modified feature.

2. The method of claim 1, wherein transforming the feature comprises:
   generating a mesh based on one or more characteristic points of the portion of the object; and
   transforming the feature based on the mesh and the one or more characteristic points of the portion of the object.

3. The method of claim 2, wherein generating the mesh comprises:
   generating a first set of points on the mesh for characteristic points associated with the element of the portion of the object;
   generating a second set of points on the mesh based on the set of first points and a modification to be applied in generating the modified feature; and
   transforming the frames of the video based on the second set of points on the mesh.

4. The method of claim 3, further comprising:
   receiving a request for modification representing a modification to be applied to the feature; and
   generating the second set of points on the mesh based on the request for modification and the set of first points.

5. The method of claim 1, further comprising:
   identifying an area on the portion of the object in the video, the area corresponding to the feature of the portion of the object; and
   transforming the area on the portion of the object the object within the frames of the video to generate modified frames with at least one modified area.

6. The method of claim 5, further comprising:
   generating a mesh based on one or more characteristic points of the portion of the object;
   generating a first set of points on the mesh for characteristic points associated with the element of the portion of the object and identifying the area based on the first set of points generated on the mesh; and
   transforming the area on the portion of the object within the frames of the video based on the first set of points on the mesh.

7. The method of claim 1, further comprising:
   generating a mesh based on one or more characteristics points of the portion of the object;
   generating a grid associated with a background of the video; and
   transforming the feature based on the mesh and the one or more characteristic points of the portion of the object while maintaining the background of the video based on the grid.

8. A system, comprising:
   one or more processors; and
   a non-transitory processor-readable storage medium storing processor executable instructions that, when executed by the one or more processors, cause the one or more processors to perform operations comprising:
   detecting at least a portion of an object in frames of a video;
   obtaining a mean face based on a picture with a fixed size, the mean face being related to the object;
   obtaining a current observation of the object using the video;
   computing an observation error based on a square of a difference between a logarithm of a function of the current observation of the object and the logarithm of the function of the mean face with the fixed size, the portion of the object being detected based on the observation error;
   transforming a feature of the portion of the object within the frames of the video to generate modified frames with a modified feature, the feature associated with an element of the portion of the object and the feature being transformed in the modified frames within the video in which the portion of the object is detected while the video is provided at a computing device and the portion of the object is detected in the video; and
   providing the modified frames including the modified feature.

9. The system of claim 8, wherein transforming the feature comprises:
   generating a mesh based on one or more characteristic points of the portion of the object; and
   transforming the feature based on the mesh and the one or more characteristic points of the portion of the object.

10. The system of claim 9, wherein generating the mesh comprises:
    generating a first set of points on the mesh for characteristic points associated with the element of the portion of the object;
    generating a second set of points on the mesh based on the set of first points and a modification to be applied in generating the modified feature; and
    transforming the frames of the video based on the second set of points on the mesh.

11. The system of claim 10, wherein the operations further comprise:
  receiving a request for modification representing a modification to be applied to the feature; and
  generating the second set of points on the mesh based on the request for modification and the set of first points.

12. The system of claim 8, wherein the operations comprise:
  identifying an area on the portion of the object in the video, the area corresponding to the feature of the portion of the object; and
  transforming the area on the portion of the object within the frames of the video to generate modified frames with at least one modified area.

13. The method of claim 1, further comprising:
  initializing a tracking process to detect the portion of the object in the video;
  from time-to-time, re-initializing the tracking process to re-detect the portion of the object in the video to continue modifying the feature.

14. The method of claim 1, wherein the portion of the object is detected based on shape units intensity vector, action units intensity vector and a position vector, the position vector indicating vertical positions of eyebrows, eyes, nose and mouth, the position vector further indicating widths of eyes, mouth and chin, the action units intensity vector indicating facial movement comprising upper lip raising, lip stretching, brow rising, and brow lowering.

15. A non-transitory processor-readable storage medium storing processor executable instructions that, when executed by a processor of a machine, cause the machine to perform operations comprising:
  detecting at least a portion of an object in frames of a video;
  obtaining a mean face based on a picture with a fixed size, the mean face being related to the object;
  obtaining a current observation of the object using the video;
  computing an observation error based on a square of a difference between a logarithm of a function of the current observation of the object and the logarithm of the function of the mean face with the fixed size, the portion of the object being detected based on the observation error;
  transforming a feature of the portion of the object within the frames of the video to generate modified frames with a modified feature, the feature associated with an element of the portion of the object and the feature being transformed in the modified frames within the video in which the portion of the object is detected while the video is provided at a computing device and the portion of the object is detected in the video; and
  providing the modified frames including the modified feature.

16. The non-transitory processor-readable storage medium of claim 15, wherein transforming the feature comprises:
  generating a mesh based on one or more characteristic points of the portion of the object; and
  transforming the feature based on the mesh and the one or more characteristic points of the portion of the object.

17. The method of claim 1, further comprising:
  obtaining grayscale values of each pixel of the portion of the object in the video;
  applying a logarithm to the grayscale values of each pixel of the portion of the object in the video before tracking the portion of the object; and
  tracking the portion of the object in the video based on the logarithm of the grayscale values.

18. The method of claim 1, wherein the portion of the object is detected based on an eye separation distance, a mouth width, a chin width and action unit information indicating a jaw drop and lip corner depression.

19. The method of claim 1, further comprising:
  generating a plurality of square grids associated with one or more regions; and
  modifying the one or more regions based on the plurality of square grids to distort the one or more regions.

20. The method of claim 1, further comprising:
  generating a square grid associated with a background of the video; and
  applying distortion to the background of the video based on the square grid.

* * * * *